United States Patent
Schüler et al.

(10) Patent No.: US 7,511,479 B2
(45) Date of Patent: Mar. 31, 2009

(54) LONGITUDINAL ADJUSTER, INCLUDING A POSITION RECOGNIZER, FOR A VEHICLE SEAT

(75) Inventors: Rolf Schüler, Heiligenhaus (DE); Joachim Flick, Hückeswagen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 191 days.

(21) Appl. No.: 11/605,913

(22) Filed: Nov. 28, 2006

(65) Prior Publication Data
US 2007/0069100 A1  Mar. 29, 2007

Related U.S. Application Data

(63) Continuation of application No. PCT/EP2005/005864, filed on Jun. 1, 2005.

(30) Foreign Application Priority Data
Jun. 23, 2004  (DE) ............... 10 2004 030 282

(51) Int. Cl.
*G01B 7/14* (2006.01)
(52) U.S. Cl. ............... 324/207.2; 324/207.24
(58) Field of Classification Search .. 324/207.2–207.25
See application file for complete search history.

(56) References Cited

U.S. PATENT DOCUMENTS

| 4,909,560 | A | | 3/1990 | Ginn | |
| 5,489,844 | A | * | 2/1996 | Preston et al. | 324/207.12 |
| 6,683,544 | B2 | * | 1/2004 | Tokunaga et al. | 341/15 |
| 7,193,412 | B2 | * | 3/2007 | Freeman | 324/207.24 |
| 2004/0046433 | A1 | | 3/2004 | Nishide et al. | |
| 2004/0189287 | A1 | * | 9/2004 | Suzuki et al. | 324/207.24 |

FOREIGN PATENT DOCUMENTS

| DE | 197 26 675 A1 | 1/1999 |
| DE | 101 36 820 A1 | 2/2003 |
| FR | 2 815 586 A1 | 4/2002 |
| GB | 2 369 683 A | 6/2002 |
| JP | 59-23740 | 2/1984 |
| JP | 2001-130369 | 5/2001 |

* cited by examiner

*Primary Examiner*—Jay M Patidar
(74) *Attorney, Agent, or Firm*—Womble Carlyle Sandridge & Rice, PLLC

(57) ABSTRACT

In the case of a longitudinal adjuster (1) for a vehicle seat, in particular for a motor vehicle seat, with at least one first seat rail (5), at least one second seat rail (8) which is displaceable relative to the first seat rail (5) and is guided therein, at least one locking device (11) for locking the first seat rail (5) to the second seat rail (8), wherein a locking row (19) of the first seat rail (5) is assigned to the locking device (11), and a position recognition device (20) with a sensor (24), the sensor (24) interacts with the locking row (19).

17 Claims, 1 Drawing Sheet

LONGITUDINAL ADJUSTER, INCLUDING A POSITION RECOGNIZER, FOR A VEHICLE SEAT

CROSS-REFERENCE TO RELATED APPLICATION

The present application is a continuation of International Application PCT/EP2005/005864, which was filed Jun. 1, 2005. The entire disclosure of PCT/EP2005/005864 is incorporated herein by reference.

BACKGROUND OF THE INVENTION

The present invention relates to a longitudinal adjuster for a vehicle seat, in particular for a motor vehicle seat, with at least one first seat rail, at least one second seat rail being displaceable relative to the first seat rail and being guided therein, at least one locking device assigned to a locking row of the first seat rail for locking the second seat rail to the first seat rail, and a position recognition device with a sensor.

In the case of longitudinal adjusters of the type described immediately above, it is known, for example, to detect the relative displacement of the seat rails by means of running wheels or the like and to determine therefrom the actual longitudinal position of the seat.

BRIEF SUMMARY OF SOME ASPECTS OF THE INVENTION

An aspect of the present invention is the provision of improvements to longitudinal adjusters of the type described immediately above. In accordance with one aspect of the present invention, a longitudinal adjuster for a vehicle seat, in particular for a motor vehicle seat, includes at least one first seat rail having at least one locking row, at least one second seat rail that is guided in the first seat rail so that the second seat rail is displaceable relative to the first seat rail, at least one locking device for interacting with at least the locking row of the first seat rail for locking the second seat rail to the first seat rail, and a position recognition device having a sensor that interacts with the locking row.

Because the sensor interacts with the locking row, i.e. the locking row in addition to its locking function obtains a further function (position recognition), the number of necessary components for the position recognition device is reduced. This simplifies the production of the longitudinal adjuster and reduces the costs.

The costs for the position recognition device can be further reduced by the use of a Hall sensor. It is also possible to use other sensors that are sensitive in particular to the repeating sequence of the uniformly arranged, different elements (preferably two types), i.e. sections, of the locking row, wherein the repeating sequence is produced by the relative movement of the seat rails. The sensor is preferably arranged for this on the second seat rail, preferably on a special holder, and is directed to the locking row through an opening or the like. The elements, the sequence of which is recognized by the sensor, are preferably identical to the elements necessary for the locking function, for example notches. However, it is also conceivable, for example, for the locking row to be merely a support for a strip with elements which can be recognized by the sensor or to have an additional pattern of holes.

The longitudinal adjuster according to the invention can be used for all vehicle seats in which the information about the longitudinal position of the seat is evaluated, for which purpose the sensor is connected in a manner known per se to a control device.

Other aspects and advantages of the present invention will become apparent from the following.

BRIEF DESCRIPTION OF THE DRAWINGS

The invention is explained in more detail below with reference to an exemplary embodiment illustrated in the drawings, in which.

DETAILED DESCRIPTION OF EXEMPLARY EMBODIMENT

Figure 1:
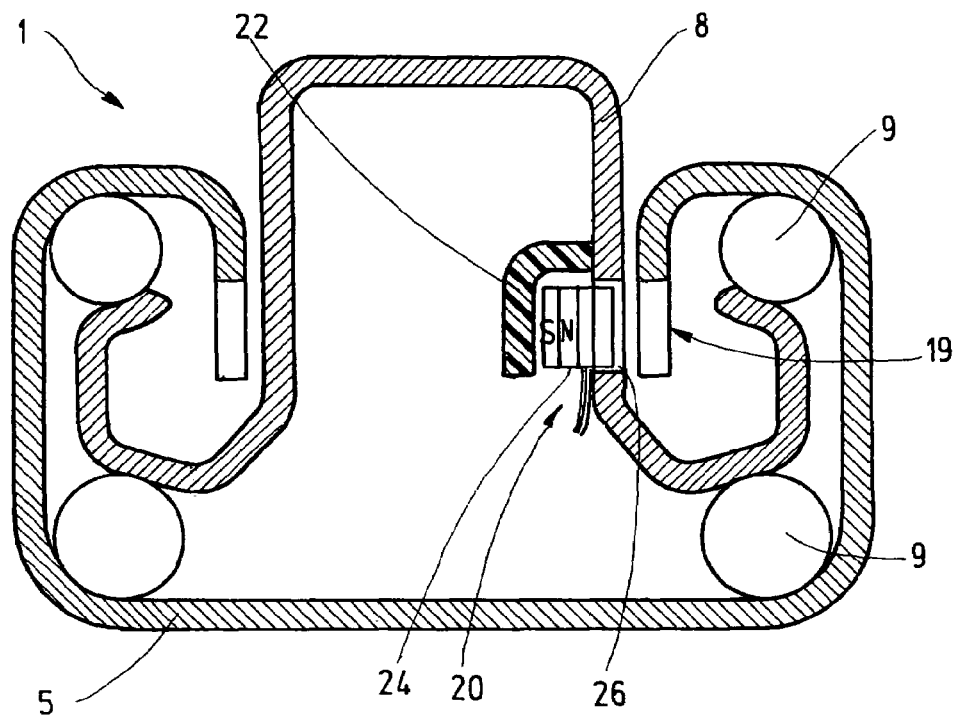
FIG. 1 shows a section through a pair of seat rails of the longitudinal adjuster.
Figure 2:
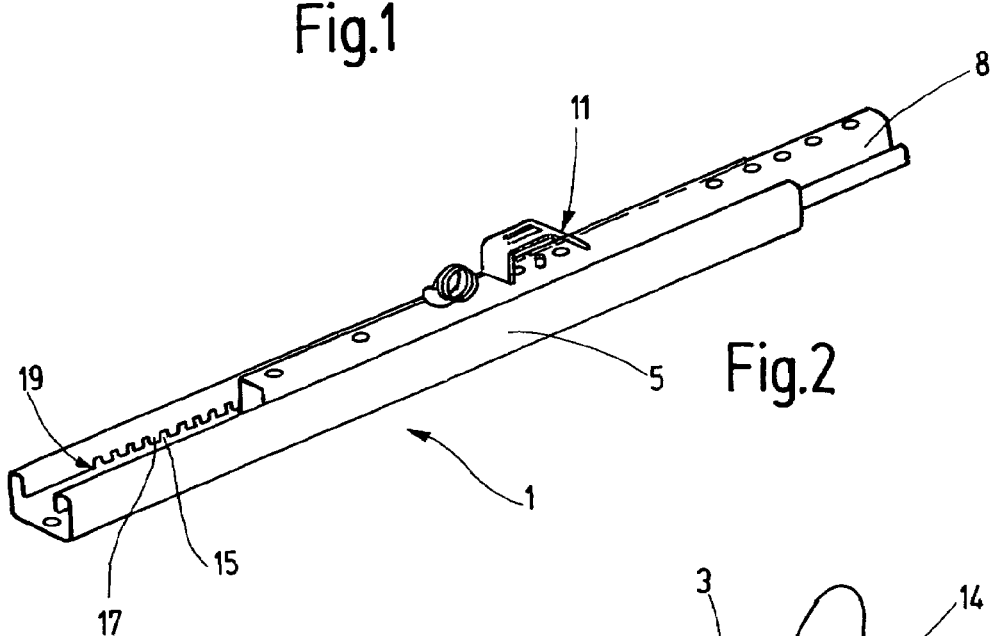
FIG. 2 is a perspective view of a pair of seat rails of the longitudinal adjuster.
Figure 3:
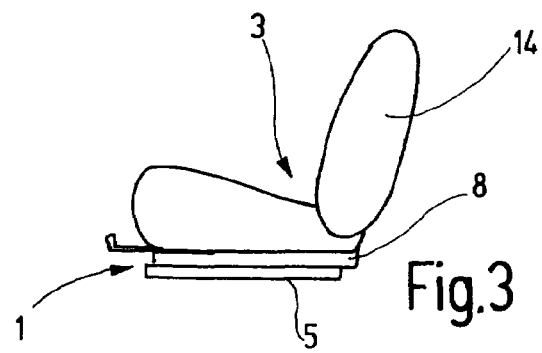
FIG. 3 is a diagrammatic illustration of a vehicle seat.

A longitudinal adjuster 1 for a vehicle seat 3 of a motor vehicle has, on each side of the vehicle seat, both a first rail 5 and a second rail 8. The first rail 5 is to be connected to the structure of the motor vehicle. The second rail 8 is connected to the seat structure of the vehicle seat 3. Balls 9 are interposed between the first rail 5 and the second rail 8, so that the second seat rail 8 is a sliding rail that is guided in a longitudinally displaceable manner in the first seat rail 5, which serves as the guide rail. Both seat rails 5 and 8 have a profile with an essentially U-shaped basic shape with bent-over edge regions. The edge regions of the first seat rail 5 are bent inward, and the edge regions of the second seat rail 8 are bent outward. The mutually facing profiles of the two seat rails 5 and 8 engage behind one another in an alternating manner by means of the edge regions.

For use of the seat 3, the longitudinal adjuster 1 is locked by one locking device 11 per pair of seat rails 5 and 8. Joint release of the locking devices 11 enables the second seat rails 8 to be displaceable relative to the first seat rails 5 and therefore the longitudinal position of the vehicle seat 1 to be adjusted. This may involve a conventional longitudinal adjustment, in which the end position of the adjustment movement is to be retained, or may be part of a free-pivoting movement, in which the backrest 14 of the vehicle seat 3 is folded forward and then the vehicle seat 3 is pushed forward in its entirety in order to facilitate access to a rear seat row, whereupon the vehicle seat 3 and its backrest 14 are then brought again into the starting position.

The locking device 11 has a spring-loaded latching plate which is moveably mounted in the second seat rail 8 and has a plurality of latching teeth that interact with a uniform row of notches 15 and bars 17 of the first seat rail 5. The notches 15 and bars 17 are uniformly arranged, alternate in a repeating sequence and are referred to below as locking row 19. In the present case, the locking row 19 is designed as a downwardly open row of teeth in the inside edge region of the first seat rail 5. However, the locking row 19 could also be a row of apertures or other patterns of holes. Instead of the latching plate, in an alternative embodiment individual latching bolts, a plurality of latching plates or other latching elements may also be provided.

In the present case, a position recognition device 20 assigned to the second seat rail 8 is arranged in the interior of the second seat rail 8 in the region of the locking device 11. A sensor holder 22 made from plastic is fitted to (e.g., mounted to) the second seat rail 8. The sensor holder 22 could alternatively be made out of the material of the second seat rail 8 and then also has a shielding effect. The sensor holder 22 mounts a sensor 24, in the present case a Hall sensor with associated magnet, which is directed at the locking row 19 through a lateral opening 26 in the second seat rail 8. In a modified embodiment, an optical sensor could also be used.

The locking row 19 serves as a pulse generator for the sensor 24, i.e. in the case of a longitudinal adjustment, by means of the repeating sequence of notches 15 and bars 17 which are guided past/relative to the sensor 24, i.e. by means of the continuously repeating, uniform alternation of non-metal/metal and vice versa (or different reflections in the case of an optical sensor), a signal is produced in a manner known per se in the sensor 24 which passes it on to a control device. Starting from an initialization (calibration) in a marked position, for example in the rearmost possible longitudinal position of the seat, the current longitudinal position of the seat can therefore be recognized incrementally, i.e. by counting or adding up the individual signals. This can be used, for example, for a memorization in the case of the above-described free-pivoting movement or for an airbag control system.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A longitudinal adjuster for a vehicle seat, the longitudinal adjuster comprising:
   at least one first seat rail, wherein the first seat rail includes at least one locking row, and the locking row has an alternating sequence of notches and bars;
   at least one second seat rail that is guided in the first seat rail so that the second seat rail is displaceable relative to the first seat rail;
   at least one locking device for interacting with at least the alternating sequence of notches and bars of the locking row of the first seat rail for locking the second seat rail to the first seat rail; and
   a position recognition device having a sensor, wherein
      the sensor is positioned so that the sensor moves along the alternating sequence of notches and bars of the locking row in response to the second seat rail being displaced relative to the first seat rail, and
      the sensor is configured for interacting with the locking row so that the sensor produces a signal in response to the sensor being moved along the alternating sequence of notches and bars of the locking row, and the signal is produced by the alternating sequence of notches and bars of the locking row.

2. The longitudinal adjuster according to one of claim 1, wherein the sensor is carried by the second seat rail.

3. The longitudinal adjuster according to claim 2, wherein a sensor holder is on the second seat rail and secures the sensor with respect to the second seat rail.

4. The longitudinal adjuster according to claim 3, wherein the sensor holder comprises plastic.

5. The longitudinal adjuster according to claim 1, wherein the sensor comprises a Hall sensor.

6. The longitudinal adjuster according to claim 1, wherein the sensor comprises an optical sensor.

7. The longitudinal adjuster according to claim 1 in combination with the vehicle seat, wherein the longitudinal adjuster is for allowing the vehicle seat to be longitudinally adjusted.

8. The longitudinal adjuster according to claim 1, wherein:
   there is an opening in the second seat rail; and
   the sensor is directed at the locking row through the opening in the second seat rail.

9. A longitudinal adjuster for a vehicle seat, the longitudinal adjuster comprising:
   at least one first seat rail, wherein the first seat rail includes at least one locking row;
   at least one second seat rail that is guided in the first seat rail so that the second seat rail is displaceable relative to the first seat rail;
   at least one locking device for interacting with at least the locking row of the first seat rail for locking the second seat rail to the first seat rail; and
   a position recognition device having a sensor, wherein
      the sensor is carried by the second seat rail and interacts with the locking row,
      there is an opening in the second seat rail, and
      the sensor is directed at the locking row through the opening in the second seat rail.

10. The longitudinal adjuster according to claim 9, wherein the locking row has a sequence of different elements.

11. The longitudinal adjuster according to claim 10, wherein the sequence of different elements of the locking row comprises uniformly arranged notches and bars.

12. The longitudinal adjuster according to claim 11, wherein:
   the sensor is positioned so that the sensor moves along the notches and bars in response to the second seat rail being displaced relative to the first seat rail; and
   the sensor interacts with the notches and bars so that the sensor produces a signal in response to the sensor being moved along the notches and bars.

13. The longitudinal adjuster according to claim 10, wherein:
   the sensor is positioned so that the sensor moves along the sequence of different elements in response to the second seat rail being displaced relative to the first seat rail; and
   the sensor interacts with the sequence of different elements so that the sensor produces a signal in response to the sensor being moved along the sequence of different elements.

14. The longitudinal adjuster according to claim 10, wherein the sensor is selected from the group consisting of:
   a Hall sensor, and
   an optical sensor.

15. The longitudinal adjuster according to claim 9, wherein:
   the sensor is positioned so that the sensor moves along the locking row in response to the second seat rail being displaced relative to the first seat rail; and
   the sensor interacts with the locking row so that the sensor produces a signal in response to the sensor being moved along the locking row.

16. The longitudinal adjuster according to claim 15, wherein the sensor is selected from the group consisting of:
   a Hall sensor, and
   an optical sensor.

17. The longitudinal adjuster according to claim 9 in combination with the vehicle seat, wherein the longitudinal adjuster is for allowing the vehicle seat to be longitudinally adjusted.

* * * * *

UNITED STATES PATENT AND TRADEMARK OFFICE
CERTIFICATE OF CORRECTION

PATENT NO. : 7,511,479 B2  Page 1 of 1
APPLICATION NO. : 11/605913
DATED : March 31, 2009
INVENTOR(S) : Rolf Schüler et al.

It is certified that error appears in the above-identified patent and that said Letters Patent is hereby corrected as shown below:

Col. 4, Claim 9, line 15, change "recoanition" to -- recognition --.

Signed and Sealed this

Nineteenth Day of May, 2009

JOHN DOLL
*Acting Director of the United States Patent and Trademark Office*